United States Patent

Dahm et al.

[11] 4,036,755
[45] July 19, 1977

[54] FILTER FOR CLEANING LUBRICATING OIL IN INTERNAL COMBUSTION ENGINES

[75] Inventors: Wolfram Dahm, Raidwangen; Josef Lederhaas, Denkendorf; Roland Merkle; Horst Lutz, both of Stuttgart; Peter Moser, Weinstadt-Beutelsbach; Friedrich Noltemeyer, Hohenacker; Heinz Roger, Stuttgart, all of Germany

[73] Assignee: Daimler-Benz Aktiengesellschaft, Germany

[21] Appl. No.: 642,568

[22] Filed: Dec. 19, 1975

[30] Foreign Application Priority Data

Dec. 19, 1974 Germany .............................. 2460073

[51] Int. Cl.² ............................................. F01M 1/10
[52] U.S. Cl. .......................... 210/168; 210/DIG. 13; 210/323 R
[58] Field of Search ............... 210/168, DIG. 13, 314, 210/323, 308, 309, 338, 339, 340, 341, DIG. 17

[56] References Cited

U.S. PATENT DOCUMENTS

| | | | |
|---|---|---|---|
| 2,076,936 | 4/1937 | Burkhalter | 210/323 R |
| 2,098,725 | 11/1937 | Hurn | 210/DIG. 13 |
| 2,271,054 | 1/1942 | Williams | 210/DIG. 13 |
| 2,559,267 | 7/1951 | Winslow et al. | 210/323 R |
| 2,605,904 | 8/1952 | Ogilvie | 210/DIG. 13 |
| 2,680,520 | 6/1954 | Beardsley | 210/DIG. 13 |
| 2,750,042 | 6/1956 | Wilkinson | 210/DIG. 13 |
| 2,995,253 | 8/1961 | Belgarde et al. | 210/323 R |

FOREIGN PATENT DOCUMENTS

995,253  8/1951  France .............................. 210/323 R

Primary Examiner—Theodore A. Granger
Attorney, Agent, or Firm—Craig & Antonelli

[57] ABSTRACT

A filter housing for accommodating at least one filter insert to filter lubricating oil, which is provided in the installed position with a geodetically upper assembly opening for inserting and interchanging the filter insert and with a geodetically lower base; the housing interior space is connected by way of two separate housing channels extending in the base, with one housing connection each for the inlet of dirty oil and for the outlet of clean oil; the housing interior space can also be connected with a housing connection separate from the housing connection for the inlet of dirty oil by way of a drainage connection adapted to be closed off by means of a closure device which can be opened at will.

23 Claims, 1 Drawing Figure

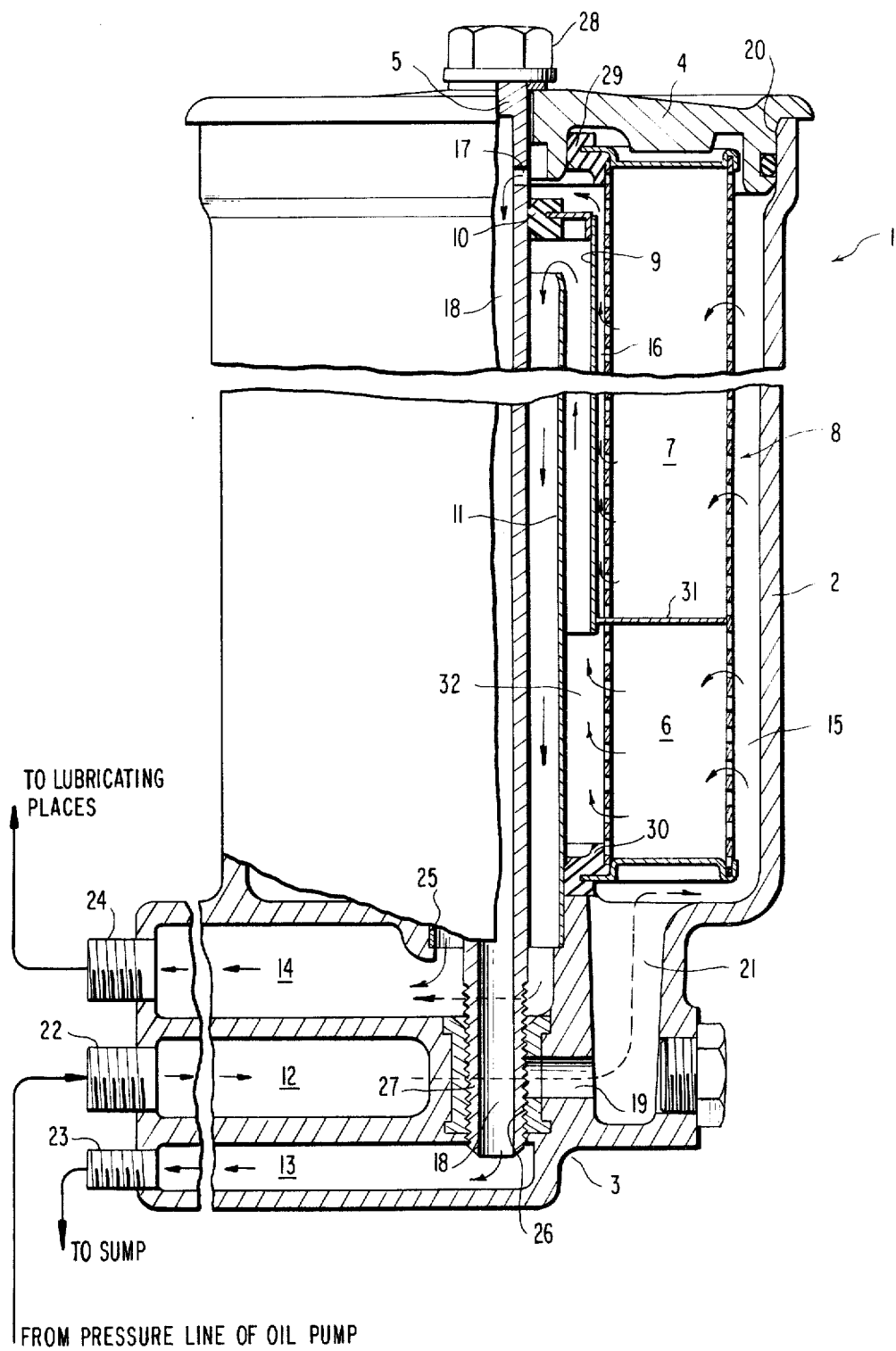

FILTER FOR CLEANING LUBRICATING OIL IN INTERNAL COMBUSTION ENGINES

The present invention relates to a filter for cleaning lubricating oil in internal combustion engines with a base provided with at least two separate passages or channels for the clean-oil and the dirty-oil, with a main-filter and fine-filter arranged in the filter housing and with a cover retained by a fastening bolt connected with the base.

Additionally, the present invention also relates to a filter housing for receiving at least one filter insert for filtering and cleaning lubricating oil, provided with a geodetically upper assembly opening in the installed position for the insertion and interchange of the filter insert and with a geodetically lower base or bottom in the installed condition, and in which the housing interior space is connected by way of two separate housing channels extending in the base or bottom part of the housing with one housing connection each for the feed or inlet of dirty oil and for the discharge or outlet of filtered, clean oil.

The present invention is concerned with the task to provide a filter of the aforementioned type in which, without large structural expenditures, the filtered liquid can be conducted back out of the main filter and out of the fine filter independently of different pressures in the passages. Furthermore, with the filter construction of the present invention, an emptying of the oil in the filter housing is to be avoided during standstill of the engine.

The problems underlying these tasks are solved according to the present invention in that a deflection or partition pipe which extends concentrically to the bolt approximately over the entire length of the fine filter and which simultaneously separates the fine filter from the main filter, is so arranged that an annular space on the clean-oil side, which is formed by the deflection pipe and the fine filter, is in communication by way of the bolt with the passage or channel for the auxiliary-flow clean-oil, and in that a vertical or upright pipe connected with the base is provided between the deflection pipe and the bolt, through which the clean oil leaving the main filter flows into the passage for the main-flow clean-oil.

In a preferred embodiment according to the present invention, the deflection or partition pipe, which is located with a slight radial spacing adjacent the fine filter, may be extended upwardly up to a place disposed shortly below the cover and may be sealingly connected with the bolt whereas the vertical pipe may terminate shortly below this place.

The thus-taken measures prevent in cooperation with a check valve arranged between the engine oil pump suction strainer and a filter, an outflow of the oil out of the filter housing and an emptying thereof and therewith the formation of an air cushion impairing the operability of the lubricating oil system as well as enable the rapid removal of gases which separate out of the oil on the inside of the filter housing.

According to the present invention, the main-filter and the fine-filter which are arranged coaxially to one another, may form a unitary filter cartridge in order to enable a rapid and uncomplicated exchange of this filter element.

During the cartridge exchange, a mixing of dirty-oil and clean-oil within the area of the filter housing cannot be avoided with the prior art main- and auxiliary-filters.

In order to eliminate this disadvantage in a simple manner, it is additionally proposed according to the present invention that a drainage bore which is kept closed by the bolt, is arranged in the path for the dirty oil, by way of which is a direct connection of the dirty-oil-side with the auxiliary-flow clean-oil side can be established after removal of the bolt.

The dirty oil thus reaches already during the loosening operation of the bolt, the oil pan or sump of the crankcase by way of the passage or channel for the auxiliary-flow clean-oil. The liquid level thereby drops on the dirty-oil side. If the bolt is now completely removed, then the clean oil side may also drain off whereby the entry of dirty oil on the clean-oil side is prevented by the higher liquid level and by the thus higher static pressure.

A filter housing of the present invention is also characterized in that the filter insert is interchangeable through the upper assembly installation of the housing which is arranged essentially vertically in the installed position so that the servicing personnel is not hampered by draining oil which runs out.

The present invention is therefore also concerned with the task to facilitate the servicing of the filter housing, i.e., to further facilitate the interchange of the filter inserts.

This task is solved according to the present invention in an advantageous manner in that the housing interior space is connected with a housing connection separate from the housing connection for the feed or inlet of dirty oil by way of a drainage connection provided in the base or bottom part of the housing which is adapted to be closed off by means of a closure device adapted to be opened at will.

In the filter housing according to the present invention, the oil remaining in the housing interior space can be drained off prior to the exchange of the filter insert.

In order to prevent that the emptying of the filter housing is forgotten prior to the exchange of the filter insert, it is advantageous in the filter housing according to the present invention that the closure means is so coupled with the fastening means of the cover that during the disengagement of the fastening means, the drainage connection is necessarily opened up.

The drainage connection could terminate, for example, in a housing connection of its own which is accessible from the outside.

In lubricating oil filters of internal combustion engines, for example, it is customary that a housing connection for the outlet or discharge of clean oil which is separate from the housing connection for the feed or inlet of dirty oil, is adapted to be connected with a reservoir or sump for the lubricating oil. With a dry-sump lubrication, the reservoir or sump is structurally separate from the crankcase or is arranged laterally at the crankcase. However, an oil pan retained at the bottom side of the crankcase may serve in a known manner as sump or reservoir.

It is advantageous in the filter housing according to the present invention that the drainage connection is interconnected between the housing interior space and that housing channel which is connected with the housing connection adapted to be connected with the reservoir or sump.

This arrangement offers the advantage that a separate housing connection for the drainage connection is dispensed with and the lubricating oil drained out of the filter housing is conducted into the reservoir or sump.

For purposes of changing the oil of the internal combustion engine, an oil sucking-off or syphoning-off may be provided by way of the short connecting stub of the measuring stick for the oil level. In the filter housing according to the present invention also the oil which is present in the filter housing is sucked-off by way of the drainage connection when the oil is sucked off. The oil in the filter housing thereby flows into the oil pan under the influence of gravity after the opening of the cover and is then sucked off by way of the short pipe stub of the measuring stick for the oil level.

In a structurally advantageous construction of the filter housing according to the present invention, provision may be made additionally that the drainage connection is interconnected between the housing channel for the inlet of dirty oil and a housing connection separate from the housing connection for the feed of the dirty oil. In this manner, one section of the housing channel for the feed or inlet of dirty oil operates as drainage connection when the closure device thereof is opened up.

A particularly short channel dimension for the drainage connection is achieved in the filter housing according to the present invention in that the drainage connection is interconnected between the housing channel for the feed or inlet of dirty oil and that housing channel whose housing connection is adapted to be connected with the reservoir or sump.

In the filter housing according to the present invention, the interior space of the housing is traversed by a bolt whose lower end engages in a bore of the base or housing bottom. It is thereby advantageous that the lower bolt end extends through the drainage connection and is constructed as closure means. In this manner, a closure means for the drainage connection which is structurally separate from the bolt can be economized.

The bolt may serve as fastening means for the cover. In addition to this function or also alone by itself, the bolt may also serve as discharge for the clean oil of a filter insert. For this purpose, a discharge channel for the clean oil is provided within the bolt whereby the bore provided in the bottom or base of the housing for the lower bolt end terminates in a housing channel for the outlet of the clean oil of this discharge channel. In the filter housing according to the present invention, the arrangement is made in such a manner that a drainage channel communicating with the housing interior space terminates at a place in the bore which is traversed by the lower bolt end, when the bolt is brought into its operating position.

Accordingly, it is an object of the present invention to provide a filter for cleaning lubricating oil in internal combustion engines which avoids by simple means the aforementioned shortcomings and drawbacks encountered in the prior art.

Another object of the present invention resides in a filter for cleaning the lubricating oil in internal combustion engines, in which an emptying or drainage of the oil in the filter housing during standstill of the engine is avoided.

A further object of the present invention resides in a filter for cleaning lubricating oil in internal combustion engines in which the filtered oil can be conducted back out of the main filter and out of the auxiliary filter, independently of any different pressures which may exist in the respective passages or channels.

Still a further object of the present invention resides in a filter housing for accommodating a filter insert intended to filter lubricating oil which greatly facilitates the servicing of the filter housing, particularly as regards the exchange of the filter insert.

A still further object of the present invention resides in a filter housing of the type described above in which the service personnel is not hampered by running-out oil during the exchange of the filter insert.

Still another object of the present invention resides in a filter housing construction in which the oil that has remained in the housing interior space can be drained off prior to the exchange of the filter insert.

Another object of the present invention resides in a filter for cleaning lubricating oil in internal combustion engines in which the formation of an air cushion impairing the operability of the lubricating oil system is minimized.

A further object of the present invention resides in a filter structure which enables a rapid and uncomplicated exchange of a filter insert constituted by a filter cartridge element forming the main filter and the auxiliary, the filter.

Still a further object of the present invention resides in a filter for cleaning lubricating oil in internal combustion engines in which a mixing of dirty and clean oil within the area of the filter housing can be effectively prevented during the interchange of the filter cartridge.

Still another object of the present invention resides in a filter housing which is simple in construction, minimizes the number of housing connections and reduces the length of the housing channels or passages in the housing required for the various functions.

These and other objects, features and advantages of the present invention will become more apparent from the following description when taken in connection with the accompanying drawing which shows, for purposes of illustration only, one embodiment in accordance with the present invention, and wherein:

The single FIGURE is a somewhat schematic elevational view, shown in longitudinal cross section in the right-half, through a filter with main- and auxiliary-flow in accordance with the present invention.

Referring now the single FIGURE of the drawing, the filter generally designated by reference numeral 1 consists of a cylindrically formed, pot-shaped filter housing having a lower bottom or base 3 formed into a structural unit together with the filter housing 2, for example, by being formed in one piece therewith, and provided with an upper assembly opening 20. A cover 4, adapted to close off the assembly opening 20, is retained in its installed position by a coaxially disposed fastening bolt 5 extending through the entire filter housing 2 and screwed into the base 3.

A housing chamber 21 disposed in the base or bottom portion 3 is in continuous open communication both with the housing interior space 15 as also—in a manner not shown in detail in the drawing—with a housing channel 12 provided in the base or bottom portion 3. The housing channel 12 terminates in a schematically illustrated housing connection 22 of the base or bottom 3, to which may be connected the pressure line of a lubricating oil pump. Two further schematically illustrated housing connections 23 and 24 of the base or bottom portion 3 are in communication with one separate housing channel 13 and 14 each, respectively. A vertical or upright pipe 11 is sealingly inserted with its lower end into a wide bore 25 terminating, respectively, in the housing interior space 15, on the one hand, and in the housing channel 14, on the other. The vertical pipe 11 is traversed with radial play by the bolt 5. The lower bolt end 27 of the bolt 5 is sealingly screwed into a narrower threaded bore 26 formed, for example, by an appropriate insert, aligned with the bolt 5 and disposed between the housing channels 13 and 14.

The upper end of the bolt 5 which extends through the cover 4 closing off the assembly opening 20, is constructed as hexagonal bolt head 28 which clamps the cover 4 against the filter housing 2 under interposition of a seal.

A unitary filter cartridge generally designated by reference numeral 8 having a main-flow filter-insert 6 and an auxiliary-flow filter-insert 7 is arranged in the filter housing 2 whereby the main filter 6 and the fine filter 7 are arranged disposed one above the other and whereby the main filter 6 faces the base or bottom part 3.

A deflection or partition pipe 9 arranged concentrically to the bolt 5 is provided on the hollow-space-side of the fine filter 7, which extends over nearly the entire length of the fine filter 7—with a slight spacing from the fine filter—and is connected with the bolt 5 shortly below the cover 4 by way of a sealing ring 10. The lower end 31 of the deflection or partition pipe 9, which extends radially, thereby separates the main filter 6 from the auxiliary, fine filter 7.

The vertical pipe 11 rigidly connected with the base or bottom portion 3, which is disposed between the bolt 5, on the one hand, and the deflection or partition pipe 9 and the main filter 6, on the other, is extended upwardly up to near the sealing ring 10.

The base or bottom part 3 is provided with the three passages or channels 12, 13 and 14, of which the passage or channel 12 serves as dirty oil inlet, the passage or channel 13 as return for the clean-oil auxiliary-flow and the passage or channel 14 as return for the clean-oil main-flow.

The upper, radially extending sheet metal cover of the filter cartridge 8 is supported at the cover 4 under interposition of an annular seal 29 while the lower, radially extending cover wall thereof is supported at the vertical pipe 11 by way of an annular seal 30.

The filter inserts 6 and 7 through which the oil flows radially from the outside toward the inside, are sealed off with respect to one another by the annularly shaped partition wall 31 which is sealed off with respect to the bolt 5 by the deflection or partition pipe 9 arranged with a radial spacing both with respect to the filter cartridge 8 as also with respect to the vertical pipe 11 under interposition of the annular seal 10. The annular seal 10 thereby has a spacing in the direction of the bolt axis with respect to the cover 4 as also with respect to the upper open end of the vertical pipe 11, which is kept in each case relatively small so that the clean-oil-streams of the two filter inserts 6 and 7 are conducted past a geodetically upper place of the filter housing 2 in order to favor the air separation.

The clean oil chamber 16 delimited by the partition or deflection pipe 10 and the auxiliary-flow filter-insert 7, is in communication by way of a cross-bore 17 of the bolt 5 with a discharge channel 18 extending on the inside of the bolt 5 and formed by an axial bore thereof, which extends through the lower bolt end 27 and as a result thereof is operatively connected with the housing channel 13.

In contradistinction thereto, the clean oil chamber 32 enclosed by the vertical pipe 11 and the main-flow filter-insert 6 is in open communication with the housing channel 14 by way of the open upper end of the vertical pipe 11.

The housing connection 23 may be connected in any suitable manner with the oil pan or sump of the motor vehicle so that the clean-oil-flow of the auxiliary-flow filter insert 7 is conducted into the lubricating oil sump of the engine.

The housing interior space 15 can be brought into communication with the housing connection 23 for the oil pan or sump by way of the drainage channel 19 in that the lower bolt end 27 is screwed out of the bore 26. In this manner, the oil present in the housing interior space 15 is necessarily drained off into the oil pan during the opening of the cover 4.

In the illustrated embodiment, the drainage channel 19 is interconnected between the housing chamber 21 and the housing channel 13. At its end opposite the housing chamber 21, the drainage channel 19 terminates in the bore 26 at a place which is kept closed by the bolt end 27, when the bolt is brought into its operating position in which it clamps the cover 4 against the filter housing 2. After removal of the bolt 5, the drainage channel 19 is in communication with the housing channel 13 by way of the bore 26. The bore 26 and the housing channel 14 form a second outlet or drainage connection for the vertical pipe 11 whereby it is avoided by the geodetically lower arrangement of the drainage channel 19 for the housing interior space 15 with respect to the housing channel 14 adapted to be connected with the lubricating places that dirty oil out of the housing interior space 15 can reach the housing channel 14 by way of the bore 26 and therewith the lubricating places.

OPERATION

The dirty oil fed by the oil pump (not shown) through the passage or channel 12 and chamber 21 into the annular space 15 formed by the filter cartridge 8 and the filter housing 2, enters into both filters 6 and 7. The filtered clean oil leaving the auxiliary fine filter 7 flows as auxiliary flow at first through the narrow annular space 16, then through the cross bore 17 of the bolt 5 into the longitudinal discharge bore 18 thereof, and finally into the passage or channel 13, from which the filtered oil of the auxiliary clean-oil stream flows off into the oil pan of the crankcase (not shown) whereas the clean oil leaving the main filter 6 flows by way of the annular space 32, the space formed between the deflection pipe 9 and the vertical pipe 11 and the space formed between the verticle pipe 11 and the bolt 5, into the passage or channel 14 which is in communication with the lubricating oil system, and more particularly with the places to be lubricated.

The flow direction of the dirty oil and the flow direction of the clean oil for the auxiliary flow out of the filter insert 7 and for the manin flow out of the filter insert 6 are indicated by arrows.

The deflection or partition pipe 9 and the vertical pipe 11 are extended upwardly as far as shown in the drawing in order to keep as small as possible the air cushions forming under the cover 4 when shutting down the engine.

By reason of the fact that with the unitary filter cartridge 8 the filtered liquid can be conducted back separately out of the main filter 6 and out of the fine filter 7, a throttling during the through-flow through both the filters 6 and 7 can be selected freely—and more particularly separately for each filter—and thus an adaptation is possible to the pressure respectively prevailing in the main flow return and in the auxiliary flow return.

The drainage channel 19 is in open communication at its right end with the chamber 21 while its left end terminates within the area of the bolt 5, whereby the drainage channel 19 is closed off by the bolt 5 itself, when the bolt 5, in the operating condition thereof, is screwed-in.

During the cartridge exchange, the bolt 5 is disengaged and its lower bolt end 27 is screwed out of the lower threaded bore 26.

If the bolt 5 is unscrewed to the height of the bore 19, then a direct connection results between the annular space 15 and passage 21 on the side of the dirty oil, and the passage or channel 13 for the auxiliary-flow clean oil. Thus, the dirty oil flows off into the engine sump by way of this channel or passage 13.

The already filtered oil on the clean-oil-side of the main filter 6 which, however, is disposed outside of the vertical pipe 11, flows back through the main filter 6 in the reverse direction and then also drains off by way of the annular space 15, the housing chamber 21, the drainage channel 19 and the passage or channel 13.

If the bolt 5 is further unscrewed and is removed, then also the oil on the clean oil side disposed on the inside of the vertical pipe 11 can drain off, however, an entry of the dirty oil into the channel or passage 14 is now precluded by the now higher level and by the therewith higher static pressure with respect to the dirty-oil-side.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A filter for cleaning lubricating oil in internal combustion engines comprising
    at least one filter insert means for cleaning lubricating oil, said filter insert means including a main filter and a fine filter arranged coaxially;
    filter housing means for accommodating said filter insert means, said filter housing means comprising a housing member having (a) a hollow interior portion for accommodating said filter insert means, (b) an insert opening disposed at the top of said housing member for inserting said filter insert means, (c) a bottom portion closing off said hollow interior portion, said bottom portion including a plurality of separate channel means in operative communication with said hollow interior portion for respectively introducing dirty oil into said filter housing means and discharging clean oil from said filter housing means, and (d) cover means for covering said insert opening;
    bolt means engaging said bottom portion for securing said cover means to said housing member, said bolt means including bore means axially extending from a geodetically upper portion of said housing member at said cover means to a geodetically lower portion of said housing member at said bottom portion for circulating auxiliary clean oil from said fine filter from said geodetically upper portion to a first of said plurality of separate channel means for discharging said auxiliary clean oil;
    drainage connection means for operatively communicating said first channel means with said hollow interior portion separately from a second of said plurality of separate channel means for introducing said dirty oil, said drainage connection means being operatively closed off by an end portion of said bolt means at said bottom portion, wherein, upon moving said end portion to open said drainage connection means, oil from said hollow interior portion drains through said first channel means;
    partition pipe means extending approximately over the entire length of said fine filter for conducting said auxiliary clean oil from said fine filter to said bore means at said geodetically upper portion;
    upright pipe means provided between said partition pipe means and said bolt means for conducting main clean oil from said main filter to a third of said plurality of separate channel means for discharging said main clean oil, said upright pipe means extending from approximately said geodetically upper portion and being connected to said bottom portion so that said main clean oil flows from said approximately geodetically upper portion to said third channel means separately from said second channel means.

2. A filter according to claim 1, wherein said fine filter is coaxially arranged above said main filter.

3. A filter according to claim 1, wherein said housing member is cylindrical.

4. A filter according to claim 1, wherein said drainage connection means communicates said first channel means with said hollow interior portion upstream of said filter insert means in the direction of flow of dirty oil from said second channel means.

5. A filter according to claim 1, wherein said drainage connection means includes a bore in said bottom portion extending from said hollow interior portion to a threaded bore in said bottom portion, said end portion of said bolt means threadedly engaging said threaded bore such that said drainage connection means is closed off.

6. A filter according to claim 5, wherein said bore of said drainage connection means opens into said threaded bore geodetically above said first channel means.

7. A filter according to claim 1, wherein said partition pipe means forms as annular space with said fine filter means through which said auxiliary clean oil flows to said bore means.

8. A filter according to claim 1, wherein said upright pipe means forms a first annular space with said partition pipe means through which first annular space said main clean oil flows upwardly to the end of said upright pipe means near said geodetically upper portion, and a second annular space with said bolt means through which second annular space said main clean oil flows downwardly to said third channel means.

9. A filter according to claim 1, wherein said third channel means are arranged in said bottom portion geodetically above said second channel means.

10. A filter according to claim 1, wherein said partition pipe means extends substantially concentrically to said bolt means.

11. A filter according to claim 1, wherein said partition pipe means includes a portion separating said fine filter from said main filter.

12. A filter according to claim 1, wherein said partition pipe means is disposed with a radial spacing adjacent said fine filter, extends upwardly up to a place located slightly below said cover means, and is sealingly connected with said bolt means, and wherein said upright pipe means terminates slightly below said space.

13. A filter according to claim 12, wherein said main filter and fine filter form a one-piece filter cartridge.

14. A filter according to claim 13, wherein said partition pipe means includes a portion separating said fine filter from said main filter.

15. A filter according to claim 1, wherein said main filter and fine filter form a one-piece filter cartridge.

16. A filter according to claim 1, wherein said first channel means is connected to a housing connection means for connecting said first channel means with a sump for lubricating oil.

17. A filter according to claim 1, wherein said third channel means is connected to a housing connection means for conducting lubricating oil to lubricating places, and wherein said drainage connection means is separate from said third channel means.

18. A filter according to claim 1, wherein said third channel means communicates with said first channel means upon moving said end portion of said bolt means from said bottom portion such that the main clean oil also drains through said first channel means when said bolt means is disengaged from said bottom portion.

19. A filter according to claim 18, wherein said third channel means are arranged geodetically above said first channel means and said drainage connection means communicating with said first channel means.

20. A filter according to claim 19, wherein said drainage connection means includes a bore in said bottom portion extending from said hollow interior portion to a threaded bore in said bottom portion, said end portion of said bolt means threadedly engaging said threaded bore such that said drainage connection means is closed off.

21. A filter according to claim 20, wherein said bore of said drainage connection means opens into said threaded bore geodetically above said first channel means.

22. A filter according to claim 20, wherein said upright pipe means forms a first annular space with said partition pipe means through which first annular space said main clean oil flows upwardly to the end of said upright pipe means near said geodetically upper portion, and a second annular space with said bolt means through which second annular space said main clean oil flows downwardly to said third channel means.

23. A filter according to claim 22, wherein said upright pipe means is secured to said bottom portion concentrically surrounding said bolt means at said threaded bore so that said second annular space communicates with said threaded bore upon removal of said end portion of said bolt means from said threaded bore.

* * * * *